(12) United States Patent
Arbenz

(10) Patent No.: US 6,856,801 B1
(45) Date of Patent: Feb. 15, 2005

(54) METHOD OF DETERMINING THE TECHNICAL ADDRESS OF A COMMUNICATION PARTNER AND TELECOMMUNICATIONS APPARATUS

(75) Inventor: Dietrich Arbenz, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/523,135

(22) Filed: Feb. 22, 2000

Related U.S. Application Data

(63) Continuation of application No. PCT/DE98/02309, filed on Aug. 11, 1998.

(30) Foreign Application Priority Data

Aug. 21, 1997 (DE) .......................................... 197 36 441

(51) Int. Cl.$^7$ ................................................ H04M 3/42
(52) U.S. Cl. ................ 455/415; 455/414.1; 455/412.1; 455/556.1; 379/112.01
(58) Field of Search .............................. 455/415, 414.1, 455/412.1, 556.1, 412.2, 414.2, 414.3, 435, 556.2, 557, 566, 569.1, 575.6; 379/112.01, 142.01, 93.23, 67.1, 355.09, 355.01, 355.02, 355.03, 355.04, 355.05, 355.06, 355.07, 355.08

(56) References Cited

U.S. PATENT DOCUMENTS

| | | | | |
|---|---|---|---|---|
| 4,633,041 A | * | 12/1986 | Boivie et al. ................ | 379/354 |
| 5,251,250 A | | 10/1993 | Obata et al. | |
| 5,568,540 A | | 10/1996 | Greco et al. | |
| 5,592,546 A | | 1/1997 | Takahashi | |
| 5,940,752 A | * | 8/1999 | Henrick ....................... | 455/419 |
| 5,943,055 A | * | 8/1999 | Sylvan ......................... | 345/839 |
| 6,009,336 A | * | 12/1999 | Harris et al. ................. | 455/566 |
| 6,185,290 B1 | * | 2/2001 | Shaffer et al. .......... | 379/220.01 |
| 6,266,539 B1 | * | 7/2001 | Pardo ....................... | 455/556.2 |
| 6,320,943 B1 | * | 11/2001 | Borland ................. | 379/112.01 |
| 6,504,925 B1 | * | 1/2003 | Schlachman et al. ....... | 379/354 |

FOREIGN PATENT DOCUMENTS

| | | |
|---|---|---|
| DE | 42 43 563 A1 | 6/1994 |
| DE | 195 48 393 A1 | 7/1996 |
| EP | 0 589 327 A1 | 3/1994 |
| GB | 2 292 043 A | 2/1996 |

OTHER PUBLICATIONS

International Publication No. WO 94/10781 (Dixon et al.), dated May 11, 1994.
International Publication No. WO 96/15490 (Keyworth et al.), dated May 23, 1996.

* cited by examiner

*Primary Examiner*—Tilahun Gesesse
(74) *Attorney, Agent, or Firm*—Laurence A. Greenbert; Werner H. Stemer; Ralph E. Locher

(57) ABSTRACT

A method of determining a communication partner's technical address for a user. A directory is provided that includes at least one technical address and at least one identifier for each one of a plurality of possible communication partners for a user. Based on an input from the user, at least one communication partner is obtained from the directory and is suggested to the user. At least one of the steps of providing the directory or suggesting the communication partner is performed automatically based on the user's previous communication behavior. A telecommunications apparatus is provided for performing the method.

3 Claims, 3 Drawing Sheets

| Name | Company | Telephone | Fax | E-Mail | Last Called | Call Frequency |
|---|---|---|---|---|---|---|
| Müller, E. | X AG | 723-4567 | 723-9876 | em@x.de | 18.3.97, 9:00 | 2 |
| Müller, M. | X AG | 723-4321 | 723-9876 | mm@x.de | 11.2.97, 11:00 | 8 |
| Müller, S. | Y KG | 33 44 55 | 66 77 88 | – | 20.9.96, 16:15 | 1 |
| Schulze | X AG | 723-2468 | 723-2233 | sch@x.de | 18.3.97, 9:30 | 4 |

METHOD OF DETERMINING THE TECHNICAL ADDRESS OF A COMMUNICATION PARTNER AND TELECOMMUNICATIONS APPARATUS

CROSS-REFERENCE TO RELATED APPLICATION

This is a continuation of copending International Application PCT/DE98/02309, filed Aug. 11, 1998, which designated the United States.

BACKGROUND OF THE INVENTION

1. Field of the Invention

The invention relates, in general, to a method and an apparatus for providing a directory containing information regarding possible communication partners for a user, and for obtaining at least one possible communication partner from the directory and suggesting the possible communication partner to the user.

To determine technical addresses, such as telephone and fax numbers, it is known practice to use suitable directories. In particular, public, company-internal and user-specific directories are known.

The known CD-ROMs containing telephone directory data represent publicly accessible directories. However, such directories do not contain e-mail addresses, for example, and also do not contain extension numbers that are important for business calls.

Centrally managed company-internal directories are comparatively complete within the company field, as far as different communication media and extension numbers are concerned. This does not apply to addresses that are external to the company. These external addresses are typically not provided or are only provided on a rudimentary basis.

User-specific directories are created by the user himself. They can therefore be well matched to the requirements of the user. However, creating and continuously updating a user-specific directory is very time consuming, therefore, many users do not use the available possibilities at all or do not use them fully.

2. Summary of the Invention

It is accordingly an object of the invention to provide a method and a device that enables the prevention of the aforementioned problems and that enables the flexible and efficient determination of the technical address of a communication partner and that, in particular, enables the administrative effort of the user to be as low as possible.

With the foregoing and other objects in view there is provided, in accordance with the invention, a method of determining a communication partner's technical address for a user. A directory is provided that includes at least one technical address and at least one identifier for each one of a plurality of possible communication partners for a user. Based on an input from the user, at least one communication partner is obtained from the directory and is suggested to the user. At least one of the steps of providing the directory or suggesting the communication partner is performed automatically based on the user's previous communication behavior.

The invention thus provides a convenient means of finding the desired technical address. In terms of effect, the invention is equivalent to a personal directory which is automatically created and automatically updated. The invention thus affords the advantages of a personal, user-specific directory with little effort for the user in terms of managing and maintaining the directory. At the same time, as it were, the user supplies the necessary information about his communication behavior by actually using the telecommunications apparatus.

According to the invention, the directory contains a multiplicity of entries each containing at least one technical address and at least one identifier or identifying particular about a communication partner. In the context of the invention, a technical address should be regarded as being, in particular, telephone and fax numbers, e-mail addresses, internet addresses and all other information used to call the communication partner. However, in the context used here, a technical address can also be a conventional postal address or another item of information about a communication partner that is suggested by a technical device. The communication partner can be a person or a machine, in the latter case a WWW server, for example.

The identifier or identifying particular is regarded as being any item of information which is directed at the user and denotes the communication partner for the user. Such a particular can be, for example, a name, a name component, a short description of the content of a WWW server and so on. For each communication partner, the directory preferably contains as many identifying particulars and as much other information as possible.

As already mentioned, the invention is intended to be equivalent, in terms of effect, to a personal directory which is built up automatically. To achieve this effect, preferred embodiments provide just such a personal directory. In alternative embodiments, on the other hand, only suitably coded information about the user's previous communication behavior is stored and is then used as the basis for suggesting an entry from a non-personal directory, for example, a central, company-internal, or public directory.

In the two cases mentioned, personal information about the user's previous communication behavior is stored, specifically either in a personal directory or directly. Furthermore, in the two cases mentioned, a predetermined (particularly a public or company-internal) directory is preferably used, specifically either such that the suggestion is taken directly from the predetermined directory or such that the personal directory is compared with the predetermined directory on creation and is added to from the latter.

In preferred embodiments in which a personal directory is created, this is preferably done by recording the technical addresses of previous communication partners over a predetermined time period or continuously. For each new technical address, an entry is created in the personal directory. The effort for the user is particularly small if the entry is completely automatically created as a result of obtaining further identifying items or particulars for this entry from available directories (for example company-internal or public directories) without the co-operation of the user. If this is not or is not entirely possible, the information still required is requested from the user in preferred embodiments. This procedure can be used for automatically creating, over time, a personal directory that is well matched to the communication habits of the user.

To simplify the search for entries in the personal directory or in another directory, the invention preferably provides that the user has to input only an arbitrary part of the information stored in the entry being sought, for example only the beginning of the name of the desired communication partner or the beginning of the technical address being sought. The latter possibility is handy if the user remembers part of the technical address, which may be the case with frequently used telephone numbers or with e-mail addresses.

If the user's input is not sufficient to unambiguously identify the desired target subscriber, one of the possible target subscribers is suggested on the basis of the user's previous communication behavior. By way of example, the communication partner called most frequently to date can be suggested, or the target subscriber amongst those possible who was addressed last. In preferred embodiments, the user can then either accept the suggestion or request another suggestion.

With the foregoing and other objects in view there is also provided, in accordance with the invention, a telecommunications apparatus for determining a technical address of a communication partner for a user. The apparatus includes a device for providing a directory that includes at least one technical address and at least one identifier for each one of a plurality of possible communication partners, and a device for suggesting at least one communication partner from the directory based on an input by a user.

The telecommunications apparatus preferably enables establishing a communication connection to the communication partner suggested or to the communication partner selected by the user on the basis of the suggestions.

The other subclaims relate to other preferred embodiments.

Other features which are considered as characteristic for the invention are set forth in the appended claims.

Although the invention is illustrated and described herein as embodied in a method of determining the technical address of a communication partner and telecommunications apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figures 1, 2:
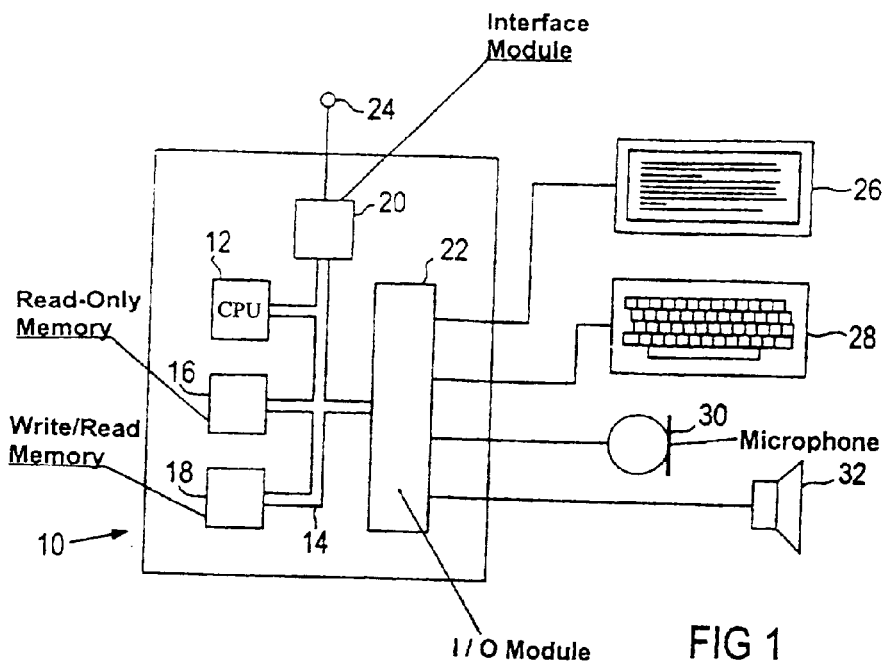
FIG. 1 shows a block diagram of a telecommunications apparatus according to the invention.
FIG. 2 shows an illustrative extract from a personal directory.

Referring now to the figures of the drawing in detail and first, particularly to FIG. 1 thereof, there is seen a telecommunications apparatus 10 in the form of a multi-functional terminal offering the functions of a telephone, a fax machine and a terminal for e-mail and internet-connections. A main part of the telecommunications apparatus 10 has a control computer with a central processor unit 12 which accesses a non-volatile write/read memory 18 and an operating program stored in a read-only memory 16 via a bus 14. In addition, an interface module 20 and an input/output module 22 are connected to the bus 14.

The telecommunications apparatus 10 is connected to a central communication system via the interface module 20 and a connection socket 24. The input/output module 22 has a display device 26 in the form of an alphanumeric LCD screen, an alphanumeric keyboard 28, a microphone 30 and a loudspeaker 32 connected to it.

The non-volatile write/read memory 18 stores a personal directory for the user. FIG. 2 shows an exemplary portion of such a personal directory. For each of the user's communication partners, this directory contains the name, company, telephone, fax number, e-mail address, the date and time that the communication partner was last called, and an identifier or particular information item about the number of connections to this communication partner.

In alternative embodiments, the directory can contain additional, fewer, or other identifiers or particular information items, for example additional technical addresses or data such as the road, town, or postal code (e.g. -zip code). Additional or other information about previous contacts with each communication partner can also be listed, for example an individual list of contact instances or the call frequency within a predetermined time period, for example within the last month. Furthermore, information about access times and frequencies can be recorded separately for each communication medium.

The components of the main part of the telecommunications apparatus 10 shown in FIG. 1 form a device for determining the technical address of a communication partner for a user. The central processor unit 12 is used, in combination with the operating program in the read-only memory 16, the write/read memory 18, the display device 26, and the keyboard 28 and together serve both as a device for providing the personal directory and as a device for suggesting at least one communication partner. In addition, the aforementioned elements and the interface module 20, the microphone 30 and the loudspeaker 32 constitute a device for establishing a communication connection to the determined communication partner.

During operation of the telecommunications apparatus 10, the user's personal directory contained in the write/read memory 18 is first created using an automatic method and is then continuously updated.

Figure 3:
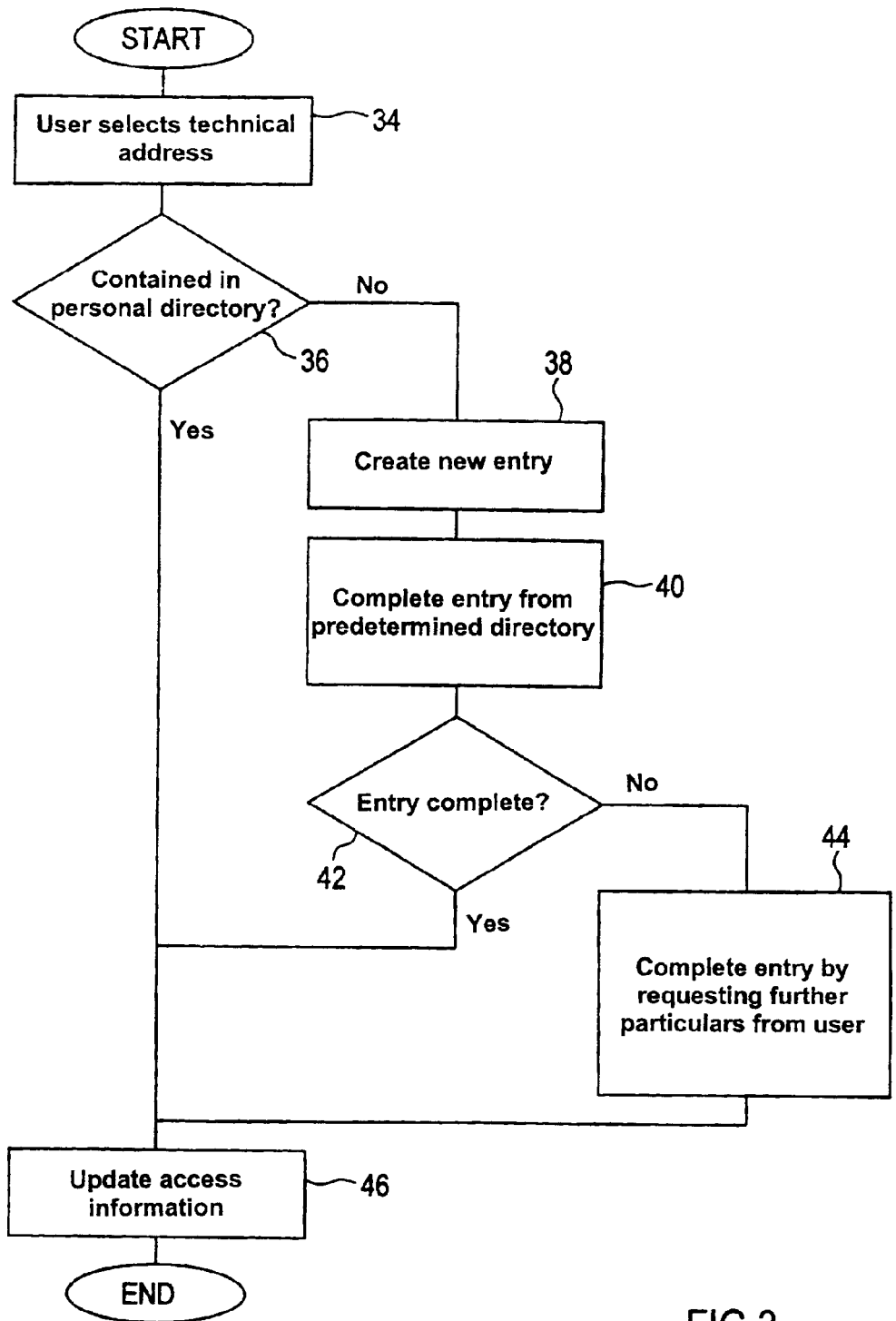
FIG. 3 shows a flowchart for a method used to create and update the directory.

To create the personal directory, the steps shown in FIG. 3 are carried out over a predetermined time period for each technical address selected by the user. When the user establishes a communication connection, and in so doing, stipulates a technical address (step 34), after the communication connection has been terminated, a check is performed to determine whether the technical address that has been used is already contained in the personal directory (query 36). If this is not the case, a new entry with this address is created in the personal directory (step 38).

The newly created entry is now completed automatically as far as possible (step 40). For this, the telecommunications apparatus 10 accesses a predetermined, external directory available in the central communication system. The predetermined directory contains both company-internal entries and entries from public directories which can be accessed by the central communication system. In alternative embodiments, the telecommunications apparatus 10 has a bulk memory that directly contains the predetermined directory, and/or has an interface for accessing an external database. Interaction with the central communication system is then unnecessary.

To complete the entry, the identifiers or particular information items about the communication partner that are provided in the personal directory, for example his name and his other technical addresses, are adopted in the personal directory from the predetermined directory. If this is not possible or is not fully possible ("no" branch of query 42), then the identifiers or particular information items that are still missing are requested from the user. The request can be made by means of an appropriate message on the display device 26, by means of speech output via the loudspeaker 32, or by means of a special tone output when the communication connection has been ended. The user inputs the requested data on the keyboard 28, and appropriate additions are then made to the entry (step 44). In alternative embodiments, the requesting of data from the user is restricted to fundamental data categories. For example, provision may be made for only the name of the communication partner to be requested from the user.

As the final step, the access information is updated in the entry called in the personal directory (step 46). In the directory structure shown by way of example in FIG. 2, the date and time of the last call are set to the current date and time for this purpose. In addition, the call frequency is increased by 1, or in the case of a newly set up entry is set to 1.

The method steps just described are carried out, even after the end of the personal directory's creation phase, whenever the user uses a technical address which is not yet known. This means that the personal directory is continuously updated. In alternative embodiments, provision can be made for the phases of initial creation and routine updating of the personal directory to be distinguished. For example, one provision may be that, in the course of operation of the telecommunications apparatus 10, new entries are recorded in the personal directory only when a command is given by the user. Alternatively, when there is a new communication partner, the user can be asked (possibly by outputting speech via the loudspeaker 32) whether a corresponding entry is to be created in the personal directory. The access information is updated with each communication connection, however (step 46).

Figure 4:
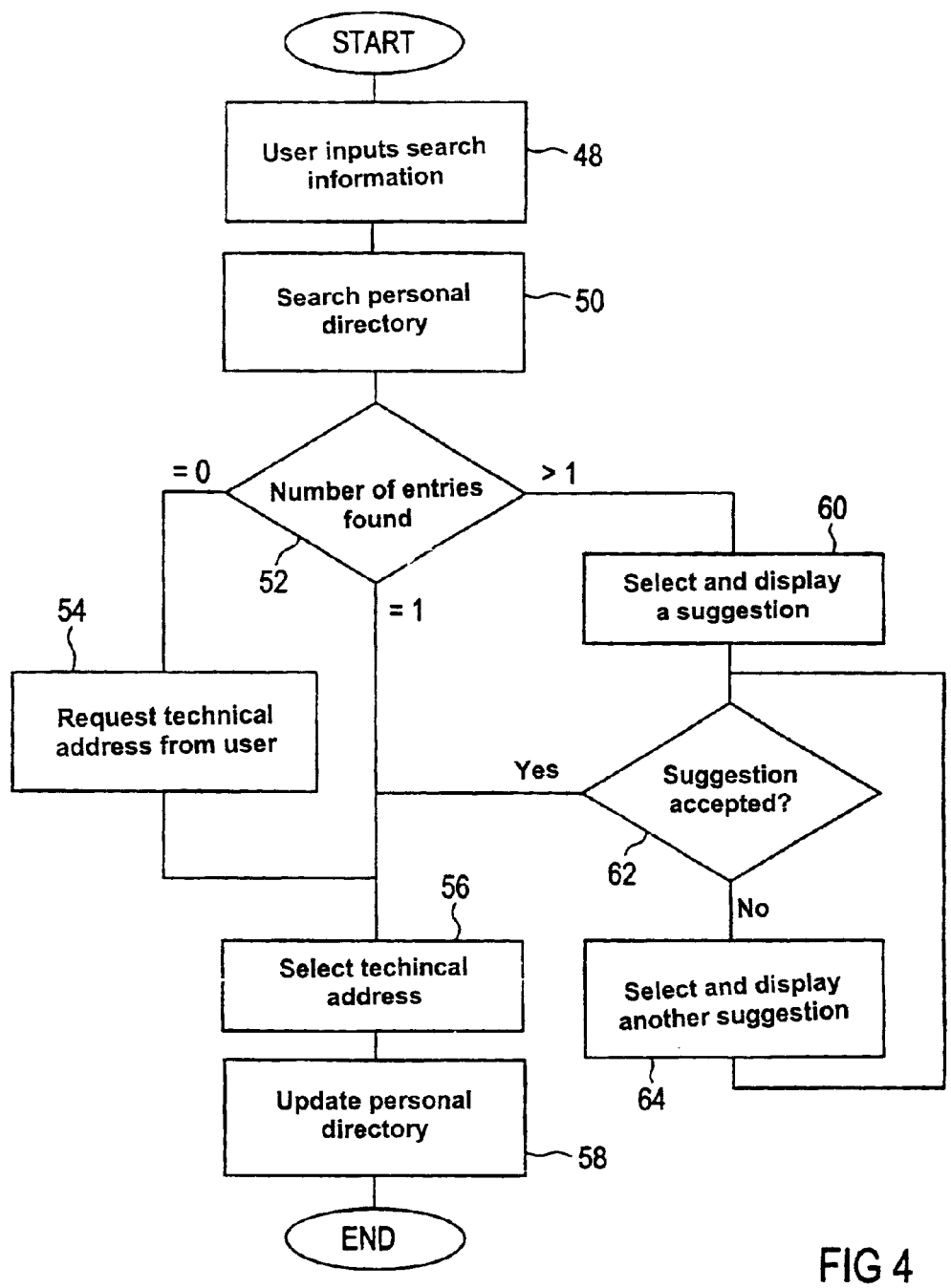
FIG. 4 shows a flowchart for a method used to determine a technical address.

To determine a technical address that is being sought, the method shown in FIG. 4 is used in the exemplary embodiment described here. The user uses the keyboard 28 to input search information, for example the beginning of a name or the beginning of a technical address (step 48). The personal directory is then searched for an appropriate entry (step 50). In the exemplary embodiment described here, each arbitrary occurrence of the search information in an entry is regarded as a hit. In alternative embodiments, individual components of an entry, for example the company, can be specifically searched for. Search strategies are also possible in which there need only be an approximate (for example phonetic) match between the search information and the entry in the personal directory.

If no entry is found ("=0" branch of query 52), then the desired technical address is requested from the user (step 54). The communication connection is established by calling this address (step 56). When the communication connection has been ended, the personal directory is updated using the method shown in FIG. 3 and described above (step 58 in conjunction with steps 38–46). In alternative embodiments, the user can be given the option of repeating the search procedure with other search information in the event of an unsuccessful search.

If just one entry is found, that is to say the search information was unambiguous, ("=1" branch of query 52), then the communication connection is established immediately by calling the technical address contained in the entry (step 56). In this case too, the personal directory has the access data which is stored in it updated (step 58 in conjunction with step 46). In alternative embodiments, the entry found can be displayed to the user via the display device 26 before the connection is established, and the user's confirmation can be obtained. If the entry found contains a postal address, this can be output on a printer or can be forwarded to a word processing system.

If the search information causes a plurality of entries to be found (">1" branch of query 52), one of these entries is selected and displayed (step 60). In the exemplary embodiment described here, a combination of two strategies is used for selection. First, the entry last called is determined amongst the entries found. If the time at which it was called is in a predetermined time period (for example within the last day or within the last hour), then it is assumed that the user wishes to connect to the appropriate communication partner again, and the entry is selected and suggested in step 60. If, however, none of the entries found was called in the predetermined time period, the time of the last call is disregarded, and the entry selected most frequently to date is suggested instead.

If, by way of example, the user inputs the digits "7234" in step 48 as search information for the personal directory shown in FIG. 2, then the entries for the communication partners "Müller, E." and "Müller, M." are found in step 50, because their telephone numbers both begin with "7234". If this query is made at 9:45 on 18.3.97 (where the date is the first number, the month is the second number, and the year is the last number shown), then the entry for "Müller, E." has priority and is suggested in step 60. If, however, the search is not carried out until 20.3.97, then the system primarily suggests the entry for "Müller, M." because of the higher overall call frequency.

In variant embodiments, modified selection strategies for suggesting one of a plurality of entries found are possible. For example, a decision can be made only on the basis of the previous call frequency or only on the basis of the time of the last call, or both criteria can be combined on the basis of a points key. If the personal directory contains more or other connection information, this information can be evaluated appropriately. By way of example, the access frequency over a predetermined, adjustable time period can be taken into account.

The entry selected in step 60 is displayed on the display device 26. In the exemplary embodiment described here, all the identifiers or identifying particulars in the selected entry are then displayed, that is to say name and company in this case. In alternative embodiments, further identifying particulars are stored in the personal directory and are displayed to the user, particularly a postal address.

Alternatively, only a selection of the identifying particulars available in the personal directory can be displayed so that the user is not burdened with superfluous information.

The user can accept or reject the entry displayed by pressing either an "Enter" key or a "Next" key on the keyboard 28. If the user accepts the suggestion ("Yes" branch in query 62), then the connection is established as described above. If the user rejects the suggestion ("No" branch in query 62), then another entry is selected and displayed (step 64). The method used to select the other entry is equivalent to that in step 60, but entries which have already been displayed are no longer suggested. In alternative embodiments, different selection methods can be used in steps 60 and 64.

Query 62 and step 64 are repeated until the entry desired by the user is found or until no further entry can be displayed. In the latter case, the user can either restart the search or can input the desired technical address directly.

In alternative embodiments, provision is made for a plurality of entries in the form of a list shown on the display device 26 to be suggested to the user. The list is sorted on the basis of the call probability determined by the system, and a cursor is already on the entry that is most probable on the basis of the selection strategy. Addressing of this subscriber can now be initiated by the user by means of a simple mouse click or by pressing the "Enter" key. If necessary, the user can select another entry by running through the list using arrow keys on the keyboard 28 or using a mouse.

If other alternative embodiments, just information about previous connections is stored instead of a personal directory. By way of example, a user-specific file can contain, for each technical address called, the date and time of calling and the call frequency to date. Such a file differs from the directory shown in FIG. 2 in that it has no identifying particulars. However, these identifying particulars can be read from a company-internal or public directory whenever the file is accessed. This means that the telecommunications apparatus 10 can make a suggestion based on past communication dealings in these alternative embodiments too, for which purpose the method illustrated in FIG. 4 can be used, for example.

I claim:

1. A telecommunications apparatus for determining a technical address of a communication partner to a user comprising:

a device for automatically providing, based on previous communication behavior of the user, a directory including at least one technical address and at least one identifier for each one of a plurality of possible communication partners; and a device, operating automatically with a predetermined selection strategy based on the user's previous communication behavior, configured to suggest at least one communication partner from the directory based on an input by the user, the predetermined selection strategy being based on a points key of combined criteria, the criteria being selected from the group consisting of call frequency between the user and each one of the plurality of possible communication partners in the directory, time of last call between the user and each one of the plurality of possible communication partners in the directory, and possible communication partners from the directory whose at least one technical address or at least one identifier match at least part of the input provided by the user.

2. A method of determining a communication partner's technical address for a user, which comprises:

providing a directory including at least one technical address and at least one identifier for each one of a plurality of possible communication partners for the user;

automatically obtaining at least one possible communication partner from the directory based on an input from the user and previous communication behavior of the user, the previous communication behavior used to suggest the at least one possible communication partner from the directory being based on a points key of combined criteria, the criteria being selected from the group consisting of call frequency, time of last call, and user input search information; and suggesting to the user the possible communication partner.

3. A method of determining a communication partner's technical address for a user, which comprises:

selecting at least one directory from the group consisting of a public directory, a directory used for a restricted user group, and a user-specific directory, the selected at least one directory providing at least one technical address and at least one identifier for each one of a plurality of possible communication partners for the user;

sorting the at least one directory based on a call probability, the call probability being based on a points key of combined criteria, the criteria being selected from the group consisting of call frequency, time of last call, user input search information, and available connection methods; and automatically obtaining at least one possible communication partner from the directory based on an input from the user and previous communication behavior of the user.

* * * * *